Patented May 15, 1951

2,553,413

UNITED STATES PATENT OFFICE 2,553,413

ROOFING MATERIAL AND PROCESS OF MAKING SAME

Morton C. Higgs, Whittier, Calif., assignor to United States Gypsum Company, Chicago, Ill., a corporation of Illinois No Drawing. Application February 28, 1948, Serial No. 12,132

6 Claims. (Cl. 117—84)

The present invention relates to an improved form of roofing material made from asphalt-impregnated and asphalt-coated sheet material, the reverse side of which has been provided with an adherent layer of a material that will prevent mutual adherence of superposed layers or convolutions thereof.

It is one of the objects of the invention to provide freshly coated and still hot asphalt-coated roofing material with a layer of material that will dry rapidly and will tightly adhere to the asphalt to form a non-mutually-adherent coating therefor.

Another objection of the invention is to provide a method for producing this material.

Asphalt coated roofing material suffers from the difficulty that if a number of layers thereof are superposed, the layers will tend to adhere to each other. It is therefore necessary to provide a coating which will prevent such adhesion. This is even true where the frontal surface (obverse) of the material has been coated with granular surfacing material, such as roofing granules, etc. It has been found that the asphalt on the reverse (back) side of such roofing material will tend to adhere to the granules of a lower layer of such roofing material, thus causing the layers to stick to each other. This is particularly troublesome in the case of roll roofing, where the convolutions of such a roll will tend tightly to adhere if the roll is subjected to summer temperatures, under which conditions asphalt tends to become sticky and adhesive.

Previous attempts to overcome this difficulty have included the dusting of the reverse side of such roofing material with inert mineral substances such as powdered mica, talc, rottenstone, slate-powder, brick-dust, etc., so as to interpose a layer of pulverulent material between the contiguous surfaces of the material. However, the application of such dry mineral powders is attended by considerable difficulties, and produces a lot of flying dust in a roofing-material plant.

Other attempts have been to apply to the roofing material an aqueous suspension of a mineral powder in plain water, in an attempt to allay this dust-forming problem, but under such conditions only a very small amount of the powdered material can be caused to adhere to the under or reverse side of the roofing material.

In accordance with the present invention, however, a suspension of an inert mineral substance, as for example powdered slate, in an aqueous medium containing dissolved, or at least dispersed, therein a suitable farinaceous material, is applied to the freshly formed but still hot asphalt-coated roofing material, so that, by the contained heat of said material the water in this suspension will be very rapidly vaporized, thus forming a tightly adherent coating which closely binds the mineral substance to the asphalt after the roofing material is cold, and will thus prevent the undersided mutual adherence.

It is a characteristic of farinaceous solutions, or colloidal suspensions and dispersions, to form a rather water-resistant coating if the coating is rapidly dried, particularly at a reasonably high temperature. It is well known that starch paste that has been rapidly dried forms a sort of horny material that will not readily re-disperse in water; in fact it is not really ever soluble therein again, unless after long soaking, and when heat is applied thereto.

Therefore, if, in accordance with the present invention a suspension of a powdered mineral substance in an aqueous suspension or solution of a farinaceous material is applied to the hot asphalt-coated material, a coating of the proper characteristics will be obtained.

Inasmuch as the manner of manufacturing asphalt coated and impregnated roofing material is well known in the art, it is not deemed necessary to illustrate the present invention by means of a drawing. Thus suitable material in continuous lengths or webs, such as roofing felt, as may be made from suitable pulp, such as paper pulp, is continuously drawn through a suitable heated melted body of impregnating-asphalt, and thereafter both sides thereof are coated with a similarly melted, but higher melting, coating-asphalt. Immediately after the application of the coating asphalt, and while the coating is still at above about 300° F., there is applied to the under side thereof, as by means of suitable coating equipment, such as rollers, etc. a suspension of the mineral powder in the farinaceous paste solution or suspension.

Purely for purposes of illustration, but without limitation, a batch of coating composition may be made as follows:

Water _____ 120 gallons (U. S.)
Starch, such as "Pearl"
 starch _____ 35 pounds avoir.
Slate flour _____ 500 pounds avoir.

The method for compounding this composition is as follows:

The 35 pounds of pearl starch are suspended in about 50 gallons of water and cooked at around 180 to 190° F. until the starch has formed a thick colloidal solution or paste. To this gelatinized starch solution there is then added about 1/10% of a suitable preservative such as sodium tetrachlorophenate, to keep it from molding or decomposing. The resulting mixture is then diluted with the remaining 70 gallons of water, and the powdered slate flour is added slowly with constant agitation to form a paint-like mixture. The slate flour should be very fine, preferably about 97% through a 325 mesh sieve.

In place of the slate flour, other suitable inert fillers or mineral powders may be employed, provided that they are sufficiently finely divided. Suitable for this purpose are fly ash, ground limestone, pyrophyllite, ground shale, talc, mica, vermiculite, brick, rottenstone, etc. Instead of boiling pearl starch in water, a form of so-called soluble starch or partially dextrinized farinaceous material may be used. Such dry paste powders are available on the market, and merely need dispersion or suspension in water to form a suitable aqueous solution or dispersion for the suspension of the mineral powder. About one pound of such starch paste powders in one gallon of water will produce a suspension of the proper consistency for admixture with the mineral substances.

Irrespective as to whether the suspension is made from or by means of a cooked starch or a cold-water paste, as indicated, the rapid drying resulting from the application of the material to the still hot asphalt-coated material will produce a water-resistant layer thereon.

The starch-mineral matter suspension should be applied to the roofing material right after it leaves the asphalt-coating apparatus, and while the roofing material is still at a temperature of from about 300° F. to 450° F., as the object is to produce very rapid drying of the applied material. This is necessary for several reasons, not the least of which is the fact that in the manufacture of roofing materials in continuous lengths, and particularly when the material is supplied with a granule coating, it becomes necessary rapidly to reverse the material to permit it to shed the excess granules. To do this, the material must be passed over rolls, and it is obvious that any applied coating must have been dried sufficiently so that it will not adhere to such rolls, as if it did so, it would greatly interfere with the smooth operation of the machines on which the material is being made.

It will be obvious that any type of farinaceous material capable of forming a more or less water-resistant layer on heating may be employed, even if it be a whole cereal flour such as wheat flour, rye flour, rice flour, corn flour etc., and that the present invention is not to be limited to any particular type of apparatus or coating-means. As stated, roller coating is quite satisfactory, but other methods of application are to be construed as within the scope and purport of the present invention, for which applicant claims:

1. Roofing material comprising an asphalt-saturated web, asphaltic coating material on each side thereof, and a layer of inert particles imbedded in a dry water-resistant horny farinaceous film superimposed upon and adhering to the asphaltic coating on one side of said web.

2. Roofing material comprising an asphalt-saturated web, asphaltic coating material on each side thereof, and a layer of inert particles imbedded in a dry water-resistant horny starch film superimposed upon and adhering to the asphaltic coating on one side of said web.

3. Roofing material as claimed in claim 2 in which the inert particles are powdered slate.

4. Process of producing a roofing material having no tendency to adhere to other similar roofing material comprising saturating roofing-felt with a bituminous material, coating both sides of the resulting saturated felt with hot asphalt and applying to one side of the thus coated product and while the asphalt thereon is still at a temperature within the range of from about 300° F. to about 450° F. a suspension of inert particles in a farinaceous paste whereby a dry water-resistant horny coating will result by reason of the rapid evaporation of the moisture contained in said paste, thereby bonding the suspended material to the asphalt.

5. Process of producing a roofing material having no tendency to adhere to other similar roofing material comprising saturating roofing-felt with a bituminous material, coating both sides of the resulting saturated felt with hot asphalt and applying to one side of the thus coated product and while the asphalt thereon is still at a temperature within the range of from about 300° F. to about 450° F. a suspension of powdered mineral particles in starch paste whereby a dry water-resistant horny coating will result by reason of the rapid evaporation of the moisture contained in said paste, thereby bonding the suspended material to the asphalt.

6. Process of producing a roofing material having no tendency to adhere to other similar roofing material comprising saturating roofing-felt with a bituminous material, coating both sides of the resulting saturated felt with hot asphalt and applying to one side of the thus coated product and while the asphalt thereon is still at a temperature within the range of from about 300° F. to about 450° F. a suspension of powdered slate in starch paste whereby a dry water-resistant horny coating will result by reason of the rapid evaporation of the moisture contained in said paste, thereby bonding the suspended material to the asphalt.

MORTON C. HIGGS.

REFERENCES CITED

The following references are of record in the file of this patent:

UNITED STATES PATENTS

| Number | Name | Date |
| --- | --- | --- |
| 109,486 | Beck | Nov. 22, 1870 |
| 925,263 | Ayrault | June 15, 1909 |
| 1,429,728 | Forrest | Sept. 19, 1922 |
| 1,481,430 | Overbury | Jan. 22, 1924 |
| 1,552,421 | Cumfer | Sept. 8, 1925 |
| 1,784,810 | Bonney et al. | Dec. 16, 1930 |
| 2,153,723 | Pohl | Apr. 11, 1939 |
| 2,361,302 | Little | Oct. 24, 1944 |